(12) United States Patent
Silva

(10) Patent No.: US 10,704,508 B2
(45) Date of Patent: Jul. 7, 2020

(54) INTERNAL COMBUSTION ENGINES, SYSTEMS, DEVICES, AND METHODS FOR PROPULSION AND POWER APPLICATIONS

(71) Applicant: Gryphon Diesel Engines, LLC, McHenry, MD (US)

(72) Inventor: Antonio Silva, Gaithersburg, MD (US)

(73) Assignee: Gryphon Diesel Engines, LLC, McHenry, MD (US)

( * ) Notice: Subject to any disclaimer, the term of this patent is extended or adjusted under 35 U.S.C. 154(b) by 104 days.

(21) Appl. No.: 15/934,975

(22) Filed: Mar. 24, 2018

(65) Prior Publication Data
US 2018/0274481 A1    Sep. 27, 2018

Related U.S. Application Data

(60) Provisional application No. 62/476,465, filed on Mar. 24, 2017.

(51) Int. Cl.
*F02F 7/00* (2006.01)
*F02M 27/04* (2006.01)
(Continued)

(52) U.S. Cl.
CPC ......... *F02M 27/04* (2013.01); *F02F 7/0087* (2013.01); *F02M 27/042* (2013.01); *F02M 27/045* (2013.01); *F02M 31/14* (2013.01); *F02P 23/04* (2013.01); *F02M 2027/047* (2013.01); *F02M 2700/31* (2013.01); *F05C 2201/028* (2013.01); *F05C 2203/08* (2013.01); *Y02T 10/126* (2013.01)

(58) Field of Classification Search
CPC ...... F02M 27/00; F02M 27/04; F02M 27/042; F02M 27/045; F02M 27/047
See application file for complete search history.

(56) References Cited

U.S. PATENT DOCUMENTS 4,189,914 A * 2/1980 Marek ................... F02C 7/2365
261/28
4,218,880 A * 8/1980 Kuroda ..................... F01N 3/18
123/568.2

(Continued)

OTHER PUBLICATIONS

Wang, Brian, Transonic Supercritical Fuel Injection Could Improve Gasoline Engines by 50-75 Percent, Mar. 3, 2010, https://www.nextbigfuture.com/2010/03/transonic-supercritical-fuel-injection.html.

(Continued)

*Primary Examiner* — Kevin R Steckbauer
(74) *Attorney, Agent, or Firm* — Law Office of Michael Antone, LLC; Michael Antone

(57) ABSTRACT

Engines, systems, devices, software, and methods of the present invention provide increased fuel efficiency and emission performance. The engine may include a magnesium alloy cast engine block cast as a mono-block with or without a ceramic inner core and including one or more cylinders designed to provide compression ratio of 10:1 to 14:1. Each cylinder may include one or more laser igniters, one or more supercritical fuel injectors configured to inject the fuel near or in a supercritical state, and carbon dioxide, which may be in the form of engine exhaust gas. The fuel may be diesel, gasoline, or other suitable hydrocarbons that may be cracked into smaller molecules prior to be injected into the cylinder.

17 Claims, 2 Drawing Sheets

(51) Int. Cl.
*F02M 31/14* (2006.01)
*F02P 23/04* (2006.01)

(56) References Cited

U.S. PATENT DOCUMENTS

| | | | | |
|---|---|---|---|---|
| 7,059,277 | B2* | 6/2006 | Matsuoka | F02M 25/12 123/3 |
| 8,197,558 | B2* | 6/2012 | Tavlarides | C10L 1/026 44/300 |
| 8,539,914 | B2* | 9/2013 | Kerns | F02B 43/12 123/1 A |
| 8,695,540 | B2* | 4/2014 | Minick | F02M 27/02 123/1 A |
| 8,935,996 | B2* | 1/2015 | Mulye | F02M 25/025 123/25 A |
| 9,856,837 | B2* | 1/2018 | Dunn | F02M 43/00 |
| 10,273,875 | B2* | 4/2019 | Lee | F02B 43/10 |
| 2004/0068987 | A1* | 4/2004 | Matsuoka | F02M 25/12 60/649 |
| 2009/0183423 | A1* | 7/2009 | Tavlarides | C10L 1/026 44/457 |
| 2010/0050977 | A1* | 3/2010 | Park | F02F 7/0085 123/195 R |
| 2011/0132306 | A1* | 6/2011 | Kerns | F02B 43/10 123/1 A |
| 2012/0260886 | A1* | 10/2012 | Mulye | F02D 41/3094 123/25 C |
| 2013/0333637 | A1* | 12/2013 | Minick | F02M 27/02 123/3 |
| 2014/0238340 | A1* | 8/2014 | Dunn | F02M 43/00 123/299 |
| 2018/0128164 | A1* | 5/2018 | Lee | F02M 31/00 |

OTHER PUBLICATIONS

Ilahia College of ENGG & Tech, Department of Mechanical Engineering, Supercritical Fuel Injection—A Promising Technology for Improved Fuel, Nov. 5, 2015, https://www.slideshare.net/saeedahmad7007/supercritical-fuel-injectiona-promising-technology-for-improved-fuel-efficiency-seminar-report.

Graham-Rowe; Duncan,_Supercritical_Fuel_injection_2009_08-11-MIT_Technology_Review.

Wikipedia, De_Laval_nozzle, https://en.wikipedia.org/wiki/De_Laval_nozzle.

Soller et al, Application of Laser-Ignition Systems in Liquid Rocket Engines, May 0, 2016, https://www.researchgate.net/publication/303331267_APPLICATION_OF_LASER-IGNITION_SYSTEMS_IN_LIQUID_ROCKET_ENGINES.

Lackner et al., Laser Ignition in Internal Combustion Engines—A Contribution to a Sustainable Environment, http://lasersparkpluginc.com/uploads/sp9.pdf Warkhede, Seminar-presentation-on-laser-ignition-system-20160212050403, https://www.slideshare.net/BhaveshWarkhede/seminar-presentation-on-laser-ignition-system-by-bhavesh-warkhede.

Choudhary_20140906_Laser Ignition System, https://www.slideshare.net/divyangchoudhary/laser-ignition-system?next_slideshow=1.

Crei—Why_Ceramic_Engines_http://ceramicrotaryengines.com/.

Azom, Jul. 10, 2003, AMC-SC1 A Magnesium Alloy Developed Specifically for Engine Blocks_Jul. 10, 2003, https://www.azom.com/article.aspx?ArticleID=2073.

newatlas.com_20130829_Stainless magnesium breakthrough bodes well for manufacturing industries, https://newatlas.com/stainless-magnesium-corrosion-monash/28856/.

Wikipedia, Exhaust gas recirculation, https://en.wikipedia.org/wiki/Exhaust_gas_recirculation.

* cited by examiner

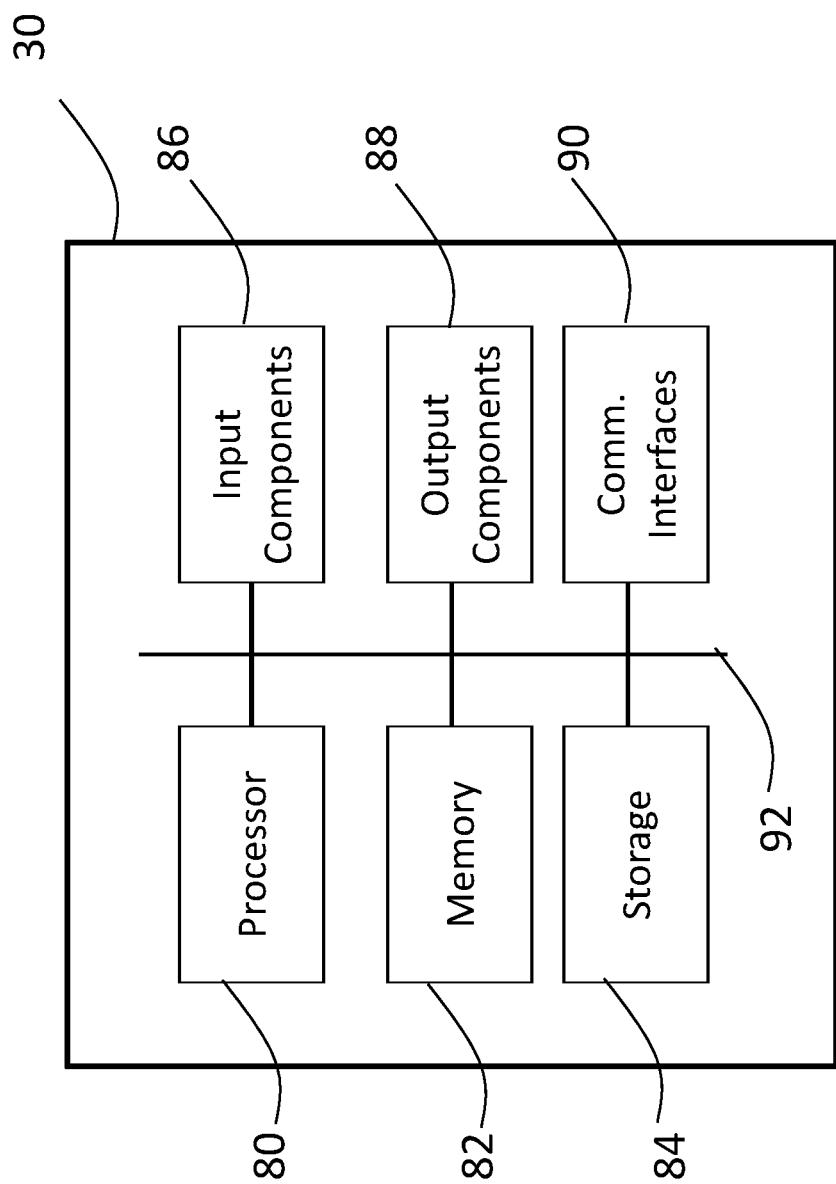

INTERNAL COMBUSTION ENGINES, SYSTEMS, DEVICES, AND METHODS FOR PROPULSION AND POWER APPLICATIONS

CROSS-REFERENCE TO RELATED APPLICATIONS

The application claims the benefit of U.S. Provisional Patent Application Ser. No. 62/476,465 filed Mar. 24, 2017, which is incorporated herein by reference in its entirety.

BACKGROUND OF THE INVENTION

Field of the Invention

The present invention relates in general to engines and more specifically to hybrid compression-optical ignition engines, systems, devices, and methods for land, air, and marine propulsion and power applications.

Background Art

The benefits of diesel engine technology have long been established. Diesel engines are more rugged and reliable than their gasoline counterparts: they are the most efficient power plant among all known types of internal combustion (IC) engines, have a longer life, require less maintenance, and have greatly reduced their fuel cost. Diesel engines typically burn about 30-50% less fuel than a gasoline engine on a per kilowatt (kW) basis, and they can burn both diesel and Jet-A (aviation) fuels. Depending on the application, they may operate on average for 15,000 to 30,000 hours before major maintenance or overhaul is required.

In many countries, diesel fuel is 50% less expensive than gasoline and 70% less expensive than Jet-A fuel. Historically, 2-Stroke engines have been less expensive, both in terms of initial purchase and routine maintenance, and are more flexible in application. Since 2-Stroke engines eliminate the valve train, the power-to-weight ratio is an exceptional advantage of 2-Stroke engines.

Diesel fuel is safer to store because it does not ignite as readily as gasoline, natural gas, or propane. It is intentionally difficult to ignite at atmospheric pressure and almost impossible to ignite accidentally. Because of its many benefits, diesel fuel has been the fuel of choice for internal combustion engines for the last several decades in Europe, Central & South America, Africa and Asia. Diesel fuel is widely available, throughout the world and most cost-effective, in the current and future economic conditions. In the US, 25% of the cars, trucks and buses use diesel fuel. In Europe, 50% of registered passenger cars use diesel fuel. In China and India, diesel represents 75% of the fuel used for road transportation. Furthermore, diesel fuel contains up to 30% more energy density per gallon than gasoline, which, in turn provides greater fuel economy (33%) and much greater torque. This is greatly needed for operation in dense environments like water, or for constant hard-working cycles like power generators, helicopters, tiltrotors and boats, and it is much more efficient for hybrid (diesel/battery) powerplants combinations. Improving further the efficiency of diesel engines will reap huge environmental and economic benefits.

However, despite the clear benefits, diesel engine technology has largely been limited to specific land-based applications, such as automobiles, locomotives, construction equipment, inboard marine, power generation, etc. Various well-known problems, such as noise and pollution, have rendered diesel engines generally unsuitable and/or undesirable for marine outboard, aviation engine, or motorcycle applications, even though these markets are substantially larger than existing diesel markets. These markets require low weight, brake-specific fuel consumption (BSFC), packing, low emissions, and reduced noise.

Most approaches to applying diesel engine technology to these applications have involved applying automobile engine design, but this approach may be at the root of the failure for some applications. Correct engine packing and weight reduction are both essential for success in these applications and may not be readily achieved with engines based on automobile technology. Applications specific engines, such as DeltaHawk aviation engine, as well as compressed natural gas (CNG) or hydrogen fuel cell solutions for the Medium and Heavy Duty Cycle ("MHDC") engine market may provide some relief. However, there remains a significant demand for improved engines that address the needs of the marine outboard, piston aviation, and motorcycle industries.

Given that transportation and power demand is expected to continue to increase, there is a continuing need for improved engines, systems, devices, and methods for propulsion and power applications for all fuel types that deliver greater fuel efficiency and/or lower emission.

BRIEF SUMMARY OF THE INVENTION

Accordingly, engines, systems, devices, software, and methods of the present invention provide increased fuel efficiency and emission performance for propulsion and power applications. The engine may include an engine block that is mono-cast using a magnesium alloy. The block may include a ceramic inner core, such as made from ceria stabilized tetragonal zirconia polycrystal ("CeTZP") with the outside made from magnesium, and one or more cylinders suitable designed to provide compression ratios of 10:1 to 15:1. Each cylinder may include one or more laser igniters, one or more fuel turbocharged supercritical fuel injectors configured to inject a mixture of a two-phased fuel near or in a supercritical state and carbon dioxide, which may be in the form of engine exhaust gas. The fuel may be diesel, gasoline, or other suitable hydrocarbons that may be cracked into smaller molecules prior to be injected into the cylinder.

As may be disclosed, taught, and/or suggested herein to the skilled artisan, the present invention addresses the need for improved engines, systems, devices, and methods for propulsion and power applications for all fuel types that deliver greater fuel efficiency and/or lower emission.

BRIEF DESCRIPTION OF THE DRAWINGS

The accompanying drawings are included for the purpose of exemplary illustration of various aspects of the present invention, and not for purposes of limiting the invention, wherein:

FIG. 2 illustrates various exemplary block diagram of the electronic control unit.

Figure 1:
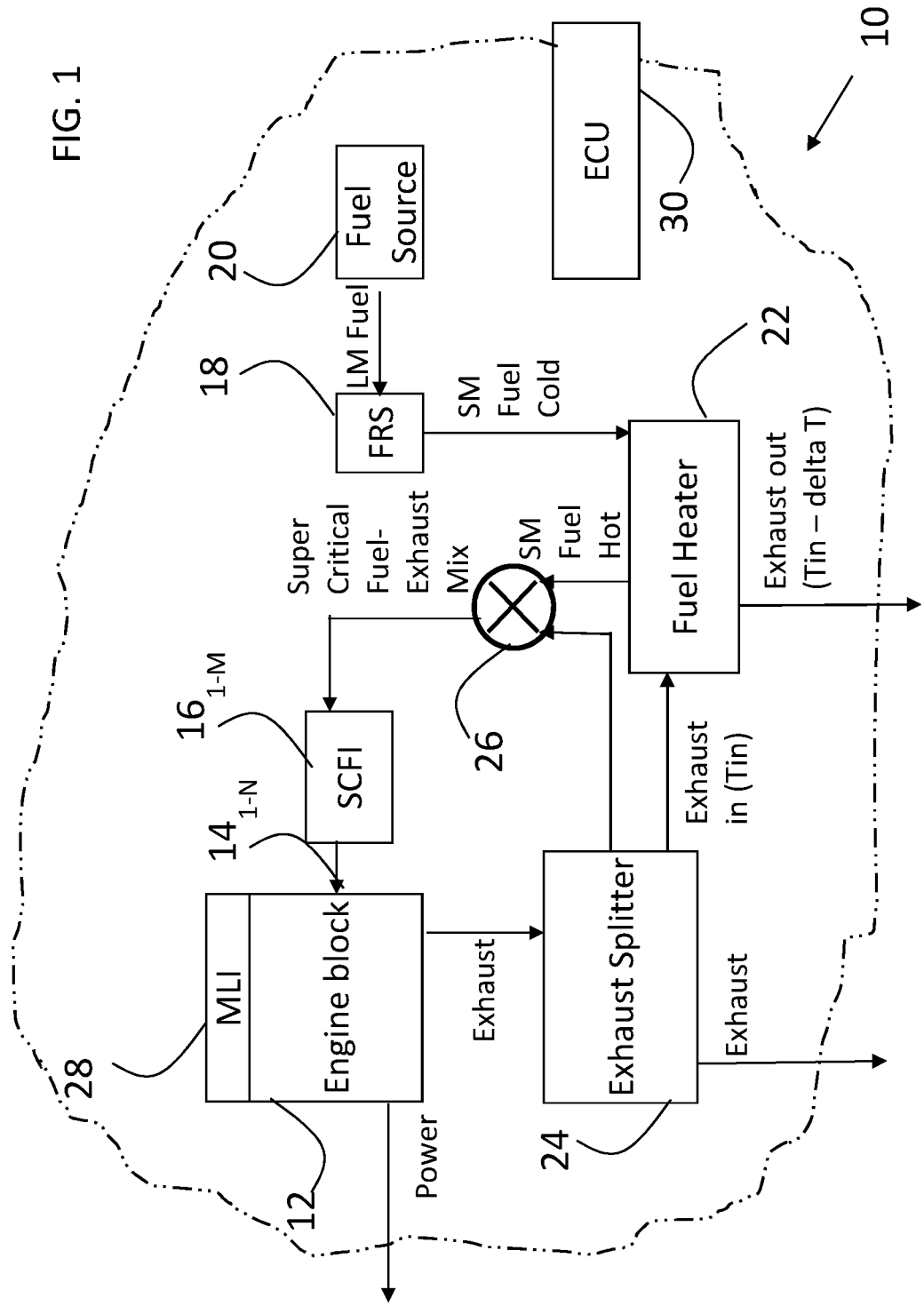
FIG. 1 illustrates various exemplary block diagrams of the system.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Systems, engines, devices, and methods of the present invention deliver greater fuel efficiency and/or lower emission for gasoline, diesel, and other fuel types used in propulsion and power applications.

In various implementations as shown in FIG. 1, the system 10 includes an engine block 12 configured to receive fuel and air (i.e., oxidizing gas) as inputs, combust the fuel in the presence of the air, and output mechanical power and an exhaust stream including combustion products and residual inputs.

The engine block 12 may have one or more inlets $14_{1-N}$ that may receive fuel via one or more corresponding supercritical fuel injectors (SCFI) $16_{1-M}$, which may be turbocharged (M and N being positive integers, which may or may not be the same value). The SCFI 16 provides fuel that may be a smaller or larger molecule fuel in a super-critical or near super-critical state, and may be mixed with an amount of exhaust from the engine block 12. The amount and temperature of the exhaust that is mixed with the fuel may be fixed or adjustable.

In various embodiments, the fuel can be mixed with other gases, such as various components of exhaust, carbon dioxide, carbon monoxide, nitrogen, nitrogen oxide, water vapor, incomplete combustion products, etc., individually or in various combinations. The exhaust and/or gases generally functioning to 1) heat the fuel to proper temperature, and 2) dilute the fuel to help reduce the coking and incomplete combustion.

A fuel reconditioning system (FRS) 18 may provide the SCFI 16 with smaller molecule (SM) fuel that has been produced by breaking larger molecule (LM) fuel received from a fuel source 20 into the smaller molecule fuel. Larger molecule fuels may include diesel, kerosene, gasoline, etc., and mixtures thereof. Whereas, smaller molecule fuels may include various shorter chain and smaller aromatic hydrocarbons, such as aliphatic hydrocarbons having a carbon chain length of 8 or less. It will be appreciated by one of ordinary skill that smaller is relative to larger, so smaller molecules derived from breaking diesel fuel may be larger than smaller molecules derived from breaking gasoline and LM and SM fuel may include one or more different molecules.

A fuel heater 22 may be provided to receive the SM fuel exiting the FRS 18, or LM fuel from the fuel source 20 in embodiments without the FRS 18, and heat the fuel to supercritical or near supercritical temperatures. The fuel heater 22 may be an electric heater and/or a heat exchanger, such as shown in FIG. 1. The fuel heater 22 may be appropriately designed to heat the fuel to desired temperatures by a skilled artisan.

In various embodiments, the fuel heater 22 may include one or more heat exchangers that use exhaust from the engine block 12 as a heating fluid that enters the heat exchanger at an inlet temperature TIN and exits the heat exchanger at an outlet temperature of TIN minus delta T.

In various embodiments, an exhaust splitter 24 may be provided to split an exhaust stream output from the engine block 12 that is provided as input to the splitter 24 into two or more output exhaust streams. The output exhaust streams may be provided to the fuel heater 22 to provide the heating fluid as described above. The exhaust splitter 24 may be a pipe section with one inlet and two or more outlets or a more complicated design as desired by the skilled artisan. In various embodiments, the amount of exhaust output to each of the two or more exhaust output streams may be adjustable or fixed.

A mixer 26 may also be provided to mix one or more of the output exhaust streams from the exhaust splitter 24 with the heated SM or LM fuel coming from the fuel heater 22. In FIG. 1 embodiments, the mixer 26 is depicted as being before the SCFI 16; however, the mixer 26 may be integrated with the SCFI 16 or provided after the SCFI 16. In addition, the mixer 26 is shown in FIG. 1 as receiving an output exhaust stream that is separate from an output exhaust stream being provided to the fuel heater 22. However, the outlet exhaust stream provided to the fuel heater 22 may also be mixed with the fuel stream. The mixer 26 may be a pipe section with two or more inlets and one outlet or a more complicated design as desired by the skilled artisan.

Furthermore, FIG. 1 depicts the SCFI 16, fuel heater 22, and mixer 26 as separate units. However, these units can be integrated into one or more units and/or maintained as separate units, but packaged together in one or more packages.

The system 10 may include a high energy optical ignition source, such as a multipoint laser ignition (MLI) system, 28 configured to provide laser ignition of the fuel by delivering light, i.e. laser beam(s), in one or more cylinders of the engine block 12. In various embodiments, the MLI system 28 may be configured such that one or more lasers may be provided proximate to the cylinder in which the lasers are being used to ignite the fuel. The light emitted by the one or more lasers may be delivered into the cylinders via one or more ignition ports.

In various embodiments, one or more lasers may be positioned remote from the engine block 12 and the optical energy provided by the lasers may be delivered by optical fiber to the engine block 12. Placing the optical sources remote to the engine block 12 may enable the optical sources to be placed in an environment that is more operationally favorable to the life expectancy of the optical source. Two or more lasers may be used to provide power to each cylinder and the optical power from the multiple optical sources may be combined and then split and provided to multiple ignition ports. Combining and splitting optical power from multiple light sources provides redundancy and a graceful failure mode for the MLI system 28.

The system 10 may include one or more electronic control units ("ECU") 30 that may monitor and/or control one or more of the SCFI 16, FRS 18, fuel heater 22, exhaust splitter 24, mixer 26, and MLI system 28. The ECU 30 may be positioned proximate or remote from the engine block 12 and may be positioned proximate to the MLI system 28.

FIG. 2 illustrates exemplary embodiments of the electronic control unit (ECU) 30, which may include one or more processors 80, memory 82, storage 84, input components 86, output components 88, communication interfaces 90, as well as other components that may be interconnected as desired by the skilled artisan via one or more buses 92. In various embodiments, the ECU 30 may include a built-in "get-home" capability by being designed with multiple layers within it, so if one layer burns out or is damaged, any of the remaining layer(s) keeps the device operating thus providing a very elevated level of redundancy.

Processor(s) 80 may include general purpose processors, central processing units (CPUs), graphics processing unit (GPUs), accelerated processing units (APUs), microprocessor, and/or any processing component, such as field-programmable gate array (FPGAs), application-specific integrated circuit (ASICs), etc.) that interpret and/or execute instructions. The processor(s) 80 may contain a cache memory unit for temporary local storage of instructions, data, or computer addresses and may be implemented as a single-chip, multiple chips and/or other electrical components including one or more integrated circuits and printed circuit boards that implements and executes logic in hardware, in addition to executing software.

Processor(s) 80 may connect to another unit or computer system, or to telecommunications network as part of performing one or more steps of one or more processes described or illustrated herein, according to particular needs. Moreover, one or more steps of one or more processes described or illustrated herein may execute solely at the processor 80.

The system 10 may implement processes employing hardware and/or software to provide functionality via hardwired logic or otherwise embodied in circuits, such as integrated circuits, which may operate in place of or together with software to execute one or more processes or one or more steps of one or more processes described or illustrated herein. Software implementing particular embodiments may be written in any suitable programming language (e.g., procedural, object oriented, etc.) or combination of programming languages, where appropriate.

Memory 82 may include a random access memory (RAM), a read only memory (ROM), and/or another type of dynamic or static storage device, such as flash, magnetic, and optical memory, etc. that stores information and/or instructions for use by processor 80. The memory 82 may include one or more memory cards may be loaded on a temporary or permanent basis. Memory 82 and storage 84 may include an ECU identification module.

Storage component 84 may store information, instructions, and/or software related to the operation and use of the ECU 30. Storage 84 may be used to store operating system, executables, data, applications, and the like, and may include fast access primary storage, as well as slower access secondary storage, which may be virtual or fixed.

Storage component 84 may include one or more transitory and/or non-transitory computer-readable media that store or otherwise embody software implementing particular embodiments. The computer-readable medium may be any tangible medium capable of carrying, communicating, containing, holding, maintaining, propagating, retaining, storing, transmitting, transporting, or otherwise embodying software, where appropriate. The computer-readable medium may be a biological, chemical, electronic, electromagnetic, infrared, magnetic, optical, quantum, or other suitable medium or a combination of two or more such media, where appropriate. The computer-readable medium may include one or more nanometer-scale components or otherwise embody nanometer-scale design or fabrication. Example computer-readable media include, but are not limited to fixed and removable drives, application-specific integrated circuits (ASICs), CDs, DVDs, field-programmable gate arrays (FPGAs), floppy disks, optical and magneto-optic disks, hard disks, holographic storage devices, magnetic tape, caches, programmable logic devices (PLDs), random-access memory (RAM) devices, read-only memory (ROM) devices, semiconductor memory devices, solid state drives, cartridges, and other suitable computer-readable media.

Input components 86 and output components 88 may include various types of input/output (I/O) devices. The I/O devices may include various sensor inputs and control lines associated with the operation of the engine, graphical user interfaces (GUI) for system setup and troubleshooting, location information via global positioning system (GPS) or otherwise, accelerometer, gyroscope, actuator data, and other input received via one or more communication interfaces 90. Output component 88 may also include displays, speakers, lights, and other devices used to provide information to users and/or other systems.

Communication interface 90 may include one or more transceivers, receivers, transmitters, modulators, demodulators that enable communication with other systems and devices, via wired and/or wireless connections. Communication interface 90 may include personal and local area network interfaces, such as Ethernet, optical, coaxial, universal serial bus (USB), infrared, radio frequency (RF) including Bluetooth, Wi-Fi, WiMax, etc., as well as wide area network, cellular-based communication protocols such as 3G, 4G, 5G, AMPS, CDMA, TDMA, GSM (Global System for Mobile communications), iDEN, GPRS, EDGE (Enhanced Data rates for GSM Evolution), UMTS (Universal Mobile Telecommunications System), WCDMA and their variants, among others, as described herein and known in the art.

Bus 92 may connect a wide variety of other subsystems, in addition to those depicted in FIG. 2, and may include various other components that permits communication among the components in the system 10. The bus 92 may encompass one or more digital signal lines serving a common function, where appropriate, and various structures including memory, peripheral, or local buses using a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, and an Accelerated Graphics Port (AGP) bus.

The system 10 may provide functionality as a result of the processors 80 executing software embodied in one or more computer-readable storage media residing in the memory 82, and or storage 84 and logic implemented and executed in hardware. The results of executing the software and logic may be stored in the memory 82 and/or storage 84, provided to output components 88, and transmitted to other devices via communication interfaces 90. In execution, the processor 80 may use various inputs received from the input components 86 and/or the communications interfaces 90. The input may be provided directly to the processor 80 via the bus 92 and/or stored before being provided to the processor 80. Executing software may involve carrying out processes or steps may include defining data structures stored in memory 82 and modifying the data structures as directed by the software.

In various embodiments, the system 10 may employ a scalable engine architecture (SEA) concept, in which parts of the system 10 may be designed to be used in multiple system configurations. SEA lowers stocking costs and substantially reduces the costs of manufacturing, assembly and replacing spare parts. Common parts may be more affordable and more suitable for use in reconfigurable and automated assembly lines. SEA also reduces the training burden and enables personnel to develop widely applicable skills. The benefits of SEA may result in high quality, lower cost parts and finished goods.

In various embodiments, a compact engine architecture (CEA) may allow the engines to be packed in a manner suitable for the four major applications without any substantial modifications. It also allows additional features and systems to be added for particular applications In various embodiments, the engine block 12 includes a light-weight metal block, such as a magnesium alloy cast as a mono-block. Magnesium alloys may be 33% lighter than aluminum and, if alloyed using cathodic solution techniques, may have acceptable corrosion and high temperature creep resistance. For example, stainless magnesium alloys produced by means of adding a cathodic solution to the magnesium alloy during melting of the ingots in the furnace for engine block casting to prevent the bonding of the hydrogen atoms, appear to reduce corrosion, when the cathodic solution is added in percentages from 0.5% to 2.5% of the total alloy weight percentage. Additionally, the casting system may be fully enclosed from the melting furnace to the casting mold(s) to reduce air exposure may further reduce corrosion. Other properties of these Mg alloys also appear suitable for engine block use, such as tensile strength, heat resistance, bolt retention, good flowing characteristics for casting, shock absorbency, damping capacity, and electromagnetic interference (EMI) shielding.

The engine block may also be produced with an inner core made of suitable ceramic materials, such as ceria stabilized tetragonal zirconia polycrystal (CeTZP) with the outside made from magnesium. The ceramic core may further reduce the heat loss from the combustion chamber due to the CeTZP ceramic exceptional low thermal conductivity of 1.9 w/m·k, which may enable the engine to deliver the same horsepower with 50% less displacement and fuel consumption. Also, the low thermal conductivity of ceramics may allow the engine to operate with lower cooling requirements. Furthermore, the ceramic allows high operating temperatures (possibly >800° C.), compared to cast iron (<600° C.), steel (<500° C.), and aluminium alloys (<300° C.), which may deliver increased combustion efficiencies and more complete combustion relative to traditional engine materials. Lastly, the CeTZP and other ceramics may be less prone to hydrothermal degradation.

Another advantage of producing the monoblock using a CeTZP inner core, is the overall reduction of the engine dimension by >40%. The reduction of the overall dimensions further reduces material costs and weight. A 100% CeTZP ceramic made engine has been tested on a small test rotary engine configuration performing very well. Additionally, CeTZP ceramic tends to be very resistant to environmental degradation associated with chemicals associated with internal combustion engines, which is a major stumbling block up to now to use ceramics in internal combustion engine design.

The engine internal components may also be made from lighter weight metals, such as light-weight steel, titanium (Ti), and/or aluminum (Al). For example, crankshafts, pins, and dowels can also be made from a special light-weight steel (6.8 g/cm3), which is not only 17% lighter than normal steel (7.8 g/cm3), but has better ductility, a slightly higher tensile strength, and a capacity to be heat-treated to RC 70 without becoming brittle.

In various embodiments, Ti may be to reduce weight or size for shafts, pins, conrods and other similar parts. Additionally, the heat-treatment of Ti can now be done upwards of Rc 70, and to its core, without becoming brittle and tensile strength in some grades has been increased to 1,750 MPa, which may increase the suitability for these applications.

Ultra-strong aluminum alloys, such as A-1500 with a tensile strength of 1.2 GPa and Young's Modulus is superior to titanium may also be used to make conrods, crankshafts, and other parts further reducing the steel content and weight of the engine. The reduced weight may allow for better-balanced diesel engines by reducing reciprocating forces.

In various embodiments, the engines may be packed to fit both marine and aviation applications, which require the tightest overall dimensions, to enable the same engine to be used in multiple applications. Engines may be configured to operate in one, some, or all orientations, e.g., upright, sideways or upside down. The blocks may have built-in mounting holes to enable custom or application specific hardware to be attached during assembly.

Moving and coated engine parts may be cryogenically treated, either employing a standard nitrogen refrigeration or a new magnetic refrigeration process that delivers superior results, which tightens the metal crystals into a very compact structure increasing hardness and lowering porosity to improve wear and fatigue properties. The engine block may be externally coated with pure aluminum, to enhance long-term protection. Internal coatings may employ a diamond-like coating (DLC) or tetrahedral amorphous carbon (Ta—C) coating, to provide lower friction and high hardness. Replaceable DLC-coated cylinder liners may be employed to extend the useful life of the engine block, allowing multiple total basic overhauls (TBOs). Piston rings will have the face surface coated with Ta—C diamond for super hard and exceptional long lasting operating time before replacement.

A substantial percentage of weight concentration in a diesel engine is in the engine block and cylinder head. Casting the engine block 12 as a mono-block, instead of the traditionally separated cylinder head and block, may reduce the combined weight of the engine block and internal parts compared to any current diesel engines or even 4-Stroke gasoline engines. Engines of the present invention, may be designed with a weight ratio of below 0.40 lb/HP for various applications. This refers to the main engine alone for marine applications and the ready-to-mount engine for aviation applications, excluding any gear-housing or transmission. Gear-housings and transmissions may also be made of the same magnesium and other alloys to further reduce weight.

For the internal components, an average weight reduction may be around 33% if lighter weight parts are used with lower compression designs. As for reciprocating parts, the weight of the pistons and conrods may be reduced by 25%, which may reduce mechanical friction and parasitic losses of energy for diesel engines to below that of an average gasoline engine. The reduced weight may also provide better engine balancing.

In various embodiments, the engine may employ fewer cylinders than traditional engines for comparable power and may be designed with many common parts. For example, manufacturers of gasoline marine outboard and piston aircraft engines use 3 and 4 cylinders for engines of 25 HP to 200 HP and 6 to 8 cylinders for engines of 225 HP and above. In various embodiments, the invention may support 2 cylinders for engines of up to 100 HP, 3 cylinders for 75 HP up to 400 HP, and 6 cylinders from 350 HP to 800 HP. This will provide excellent production and retail cost savings and exceptional high number of common parts and weight reduction.

Engines of the present invention may be operated at low compression to allow superior optimization of combustion timing. In low compression engines, compression temperature and pressure decrease at the top dead center (TDC). While this lower temperature makes the ignition take longer when fuel is injected near the TDC, it enables a better mixture of air and fuel. This results in a highly efficient diesel engine in which a higher combustion expansion ratio is obtained. The higher expansion ratio prolongs the delivery of torque to the drivetrain. Conversely, current high-compression diesel engines only deliver a short, super strong force to the drivetrain, which may be destructive. Low compression makes it possible to deliver high torque throughout the expansion of the piston, which yields greater efficiency. With low compression, the engine exhibits a flatter torque line, which means that it has high torque from the low end to the high end of the RPM (Rotation per Minute) engine range.

Low compression also substantially reduces the formation of NOx and soot, the main causes of diesel pollution and black smoke. In low compression engines, localized high-temperature areas and oxygen insufficiencies may be reduced to improve combustion uniformity and efficiency. Target specifications for various embodiments may be less than 0.001 g/km of fsDPM (particulate) and 0.001 g/km of fsNOx, based on independent testing by Sandia National Laboratory.

Cold-start ignition of diesel and other fuels may be accomplished using high temperature ceramic igniters (ceramic glow plugs) and multi-hole piezo injectors, or using the MLI system 28.

Supercritical fuel injectors 16 may significantly reduce fuel atomization and droplet vaporization (slow burning process), which may increase combustion efficiency. In various embodiments, the SCFI 16 may operate in a range including 2,000 bar, which may improve the cost and performance of the SCFI relative to high pressure systems operating around 3,000 bar or higher. The SCFI may include a choke, which resembles a de Laval nozzle, to accelerate the velocity of the gas content of the two-phase fuel, to permit the gas content in the fuel to achieve supersonic velocity during injection. It will be appreciated that the nozzle may be varied to accommodate different types of fuel.

Since diesel is heavy, viscous, and less volatile than gasoline, not all the fuel is burned during combustion, which results in higher levels of particulate soot. The higher combustion temperatures for diesel also results in increased NOx emissions. By raising diesel to a supercritical state, and/or breaking it into smaller molecules, before the fuel is introduced into the combustion chamber of the engine block 12, viscosity becomes less of a problem. Additionally, the high molecular diffusion of supercritical fluids means that the fuel and the air mix together much more rapidly with air enabling the fuel to combust more quickly, cleanly, and completely. An important advantage of SCFI is that it substantially lowers the surface tension of the fuel, providing positive advantages in better combustion and adding to cleaner emissions.

In various embodiments, exhaust gases (EG) may be used to heat the fuel in a heat exchanger (HE). It is generally desirable to maintain the fuel temperature in the range of 560-580° C. EG flow rates may be regulated via electrically operated valves controlled by the ECU 30 using temperature sensors positioned in the fuel rails of the HE to control the fuel temperature. The heated fuel exits the HE and passes to the SCFI.

Engine emissions using SCFI may be reduced by 80% in a high compression 18:1 engine and possibly more than 90% in low compression engines of the present invention, which may result in 10-30% fuel reduction. SCFI test were performed by Sandia National Laboratories and National Institute of Standards and Technology (NIST).

While SCFI may provide significant benefits, for larger molecule fuels, such as diesel, it may be desirable to mix EG with the fuel to reduce, and preferably eliminate, coking of the fuel in the fuel injector. Mixing may take place either before or after pressurizing the fuel to the final injection pressure desired. If the process to bring the fuel to super critical state takes place before being pressurized, the fuel pump may need to a two-phased fuel pump, to permit operation with a two-phased fuel to accommodate changes in state.

The MLI system 28 of the present invention may enable more precise ignition of the fuel mix at a precise crankshaft angle (or piston position) in each cylinder individually. Prior art compression ignition engines are limited in precision due to as-built and wear factors creating variation in design and operation, which is likely to vary between cylinders and with different diesel fuel compositions.

The present invention addresses problems that exist with deployment of MLI systems in prior art engines, which involve fouling of the laser input to the engine block 12, thus impacting the reliability of the MLI system to ignite the fuel. In the present invention, the SCFI, low compression, and other features serve to reduce the soot and other incomplete combustion products that may foul laser input port(s) into the cylinder. In addition, the lasers used in the MLI system 28 may include a lense coating with a damage threshold greater than 3 GW/cm2 enabling the laser to provide some level of self-cleaning.

The MLI system 28, as with other systems described herein, may be controlled by the engine's electronic control unit (ECU) to enable precise ignition of the fuel that may be optimized during operation. Engine timing information may be provided from sensors mounted on the crankshaft to permit the precise crankshaft angle position for firing the laser. This is in stark contrast to current diesel engine technology, where ignition of the fuel depends on compression and temperature which it may vary after each injection. The ECU 30 may also control various other systems, such as electronic superchargers and electric drive pumps.

The MLI system 28 may be very suitable for low compression fuel ignition and very effective at igniting diesel and other fuels at extreme low temperatures. Additionally, laser ignition may significantly increase combustion timing due to the light, or laser beam(s), emitted by the laser(s) that is providing the ignition energy is moving at the speed of light, rather than only conduction and convection. Increased combustion rates may increase combustion efficiency, thereby reducing pollutants resulting from incomplete combustion. The ignition laser beam also adds energy to the fuel. And the MLI system breaks the molecule from inside unlike traditional ignition of fuels, making the combustion more efficient and more total.

MLI systems 28 may be employed in various patterns such as pre-injection, main injection and post-injection, to improve cold-start and other capability. Each injector may be controlled individually by the ECU 30, which may be used to tune each cylinder as desired to improve balance and other factors. The MLI system 28 may be employed in different embodiments. For example, the MLI system 28 may use a single controller box with optic fiber cables and a laser plug to distribute the laser beam(s) to each individual cylinder according to the firing order. Another system uses an individual laser for each cylinder in a self-contained unit with the firing of each individual unit on each cylinder controlled by the engine ECU. Also, the lens on each laser plug may deliver 3 to 4 laser beams into each cylinder by splitting the receiving main beam, to generate multiple flame fronts and further accelerate combustion, which further increases efficiency and cleaner exhaust gases. The lens in the laser plug may be made from sapphire or other dedicated material.

The MLI system 28 may enable the engines of the present invention to operate with an extremely lean fuel mixture (>85:1) and for fuel ignition at a wide range of temperatures, with reduced misfiring. Independent test with high pulse energy, e.g., 25 mJ, and short pulse lengths (less than 3 ns) was able to initiate optical breakdown at focal lengths of up to 80 mm and reliable ignition in both stratified and homogenous fuel modes.

The Fuel Reconditioning System 18 may be employed to reduce the molecular size of the fuel by breaking, or "cracking", the fuel into smaller molecules, which typically will increase the combustion efficiency of the fuel, other factors being the same. The FRS 18 may be embodied as a high-voltage electric current device operating at a specified frequency and wavelength. It can also employ several frequencies and wavelengths to better adapt to the different sizes of the broken molecules which come from each "cracking". At each "cracking", each broken portion of the molecule increasingly becomes smaller. It is desirable to make each broken piece as small as possible to increase the combustion velocity, which in turn releases higher combustion energy. The FRS process may be applied before the fuel is brought to supercritical state and after the fuel is pressurized, to properly take in account the state of the fuel molecules, to prevent taking other shapes once either the "cracking" or SCFI process is employed, as the fuel moves from one process to the other prior to injection.

FRS testing with Tier 3 rated diesel engines has shown that it may provide various system benefits, such as increased fuel volatility, density and pressure, and decreased boiling point. The net result may be that the SM fuel combusts more completely and rapidly, and at lower temperatures, which may produce more horsepower per unit of fuel burned, reduce fuel consumption, and distribute power more evenly for smoother performance.

In various embodiments, the engines may be supercharged or crankcase aspirated. For example, it may be desirable to equip engines with power ratings of 75 HP and higher with one or more superchargers. The superchargers may be electricity-driven and controlled by the ECU 30 for the highest performance throttle response, especially when accelerating from being idle (i.e. "out of the hole" throttle response), which reduces lagging. Supercharged engines may provide more than 100 HP per liter, and potential more than 200 HP per liter. Crankcase aspirated engines performance may be controlled by electronically controlling the air and fuel management via the ECU. The electric power may be provided by a battery or a water-cooled exhaust-driven generator(s) (6-7 KW) or a radiant generator.

In various embodiments of the engine system 10, a magnesium alloy engine block 12 cast as a mono-block with or without a ceramic inner core is provided to receive fuel and air as input into one or more combustion chambers/cylinders, where the fuel is combusted, and power and exhaust are output. A fuel reconditioning system 18 breaks down at least a portion of a larger molecule fuel into a smaller molecule fuel. Exhaust from the engine block 12 is provided to a heat exchanger 22 to heat the smaller molecule fuel. A mixer 26 is provided to mix exhaust with the heated smaller molecule fuel to produce an exhaust-supercritical fuel mixture, which is injected via supercritical fuel injectors 16 into engine block 12. The supercritical fuel mixture is compressed in the engine block and ignited via an optical ignition system, such as a multi-point laser ignition system, to combust the fuel with air and exhaust exits the engine block. An electronic control unit 30 controls the overall operation of the engine, at least one of the other steps.

For example, in various embodiments, the electronic control unit 30 includes memory and one or more processors to monitor, typically from sensor feedback, and control the breaking down of at least a portion of the larger molecule fuel into the smaller molecule fuel, heating of the smaller molecule fuel to a supercritical temperature, mixing of exhaust with the heated smaller molecule fuel to produce an exhaust-supercritical fuel mixture, injection of the exhaust-supercritical fuel mixture in the cylinder of the engine block, and the timing of the compression, ignition, and combustion of the fuel and exhausting the combustion products from the engine.

As described above, while an order of operation has been provided, it will be obvious to one of ordinary skill that various steps may be rearranged, broken into multiple steps, and potentially eliminated depending upon the particular application and fuel. For example, gasoline retrofit engines and methods of the present invention may involve replacing one or more spark plugs with a laser or other optical ignition system. One or more supercritical fuel injectors may be added to the fuel intake of the engine to inject an exhaust-supercritical fuel mixture into the engine. A fuel reconditioning system may be installed between the supercritical fuel injectors and a fuel source to break larger molecule fuel into smaller molecule fuel. A mixer and heat exchanger and associated plumbing may be provided to combine the smaller molecule fuel and exhaust from the engine to provide the exhaust-supercritical fuel mixture to the supercritical fuel injectors.

Depending upon the engine being retrofitted according to the present invention and the intended application(s), various steps of the processes and elements may be eliminated and other added as appropriate. For example, it may not be necessary to employ SCFI in some implementations or to employ a separate heat exchanger before mixing the exhaust with the fuel. When smaller molecule fuels are the fuel supply, it may not be necessary to employ an FRS 18. Person of ordinary skill will be able to envision and practice other variations that are within the scope of the invention for newly built engine and retrofit applications.

For the aviation application, by means of continuously adjusting to altitude pressure, the supercharger may be particularly useful in the range of 450 to 1,200 HP in takeoff, climbing and at-altitude engine performance. The superchargers may continuously deliver the maximum power possible at sea level at altitudes from sea level up to and including 28,000 feet, unlike many turbines which degrade in performance at higher altitudes.

In various embodiments, the engines may be gas-cooled or liquid-cooled, e.g., air, water. In many embodiments, fresh water may be an appropriate coolant. For aviation use, liquid-cooling translates into lower thermal variance, which reduces engine block cracking especially after landing in very cold environments. For marine use, closed-loop cooling eliminates the problem of salt-water since no salt water gaets inside the engine, a big problem with marine outboard engines.

In various embodiments, engines of the present invention may achieve 10,000 hours of operational life for high RPM applications before the need for overhaul and 15,000 hours for the low RPM applications. Prior art engines may only achieve 1,500 hours of operational life, on average, for current 4-Stroke gasoline engines in the marine, piston aviation and gasoline generator applications.

Various embodiments may achieve lower RPMs, e.g., 5,500 RPMs for the I-3 block, and 3,000 RPMs for the V6 or larger blocks, which may reduce the amount of wear and tear on the engine, while providing a flat torque curve than current gasoline engines. This is excellent for generating electrical power in the marine environment, for aircraft applications or for drones. Higher-amps electronic onboard generators can be available, especially to supply power for Synthetic Aperture Radars in UAVs and energy-based systems that are ever smaller but have increasing energy demands.

Furthermore, the present invention is compatible with various hybrid electric technologies and batteries, including lithium and magnesium based batteries. Various embodiments of the system 10 may include a 48-V electrical architecture and/or voltage regulators for existing 12 V or 24 V systems.

Various other technologies and design choices may be employed to reduce parasitic power losses and improve performance. These technologies include, for example, electric-drive water and oil pumps and superchargers, exhaust-driven generators, the use of only one compression ring and one oil ring, improved piston-rings to reduce oil sloshing, advanced coatings, such as silicon-reinforced porous aluminum, offset crankshafts, oil heaters, high-output high-density alternators and radiant generators.

Diesel engines of the present invention may support both propulsion and electric power for marine applications. As many recreational boats currently have one gasoline tank for the engine, and one diesel tank for an on-board electrical generator, the present invention would allow manufacturers to eliminate one fuel tank and/or increase the amount of fuel carried.

Various marine applications may require additional features, such as the capability to operate with forward-facing or rear-facing propellers, flywheel-mounted electric starter, closed-loop cooling to avoid corrosion from salt water, built-in electric steering with trim & tilt, under-water exhaust, tiller, carbon fiber or graphene panels for the external panel covering, etc. An electrical engine may be included for outboard marine applications to extend stealth trolling and port operations with near-zero fuel use. An electric motor may be directly assembled onto the transmission housing in order to reduce both weight and excess parts and also may function as a starter.

Digital throttle control may be included for all outboard engines 55 HP and above and optional below 55 HP. A digital joy-stick will be available with several driving modes and will be pre-loaded. In some embodiments, a horizontal crankshaft layout with a right-angle computer-controlled transmission may be employed. Gear shifting may take place in the transmission, instead of the lower drive in order to eliminate the typically problematic area of traditional outboard propulsion systems.

Additionally, a unique twin-pinion gear design in the torpedo lower gear case may be employed to address a traditional weakest point in outboard design. Current outboard engines use only one pinion shaft to distribute the torque load and support high stress loads, which is very hard on outboard engines especially during re-entry into water after going airborne. With the two-gear design, the stress is cut in half. A collapsible, failsafe design for the lower drive may be, in order to save the engine from any major underwater hit.

Software and gyroscopes may interface with the automated trim tabs to provide the engines with continuous automatic electric control of the engine tilt. This automatic process continuously controls the adjustment, e.g., thousands of times per second, of the boat's engine tilt and both independent trim tabs, from the start and throughout operation in any sea condition at any speed. Automatic control of each trim tab independently may help to level off the boat, should the weight onboard not be properly distributed. The software may also interface with GPS units and auto-pilot navigation systems.

Aviation applications may include various features, such as a single throttle lever control without fuel mix manual control to reduce engine blow-out risk and lower exhaust gas temperature (EGT). A dual-channel FADEC system may be employed and pressure adjustable superchargers. Since diesel and Jet-A fuel have the same ignition temperature (~400° F.) in-flight refueling is possible for small- to medium-weight UAVs, substantially increases possible airborne time as well as the operating capabilities of each aircraft, like range and flight endurance. In addition, engines of the present invention are not cycle limited, just engine TBO making short to medium range aviation more cost effective. Foam filtration of diesel fuel may be employed as well as fuel circulation with heating. Infrared (IR) signature suppressors on engine exhausts may be included for military applications.

For MHDC land vehicle applications, engines of the present invention may supply a total power output of 2,000 HP to 3,000 HP directly to the wheels under an All-Wheel drive mode, making them capable of moving trucks weighing over 120,000 lbs, as well as higher payloads. Independent motors may be placed on each side of the axles to enable constant automatically adjusted power output and individual control for exceptional traction and safety under adverse conditions.

Active gradient control (AGC) for descending operation, each wheel may provide continuous regenerative energy to help recharge the batteries in hybrid embodiments. The AGC can provide constant speed in all types of terrain, especially high gradient terrain (i.e. uphill) where current trucks suffer greatly from exceptionally low fuel economy.

For power generator applications, the ECU 30 may be configured to provide unique throttle control to regulate the engine throttle according to electrical output demands, which is in contrast to current generators that operate on only two levels—either idling or working at full throttle.

Since 2-Stroke diesel engines execute four power pulses per revolution and operates at low compression, engines of the present invention can supply a longer continuous positive torque to the piston, and therefore, much more force to the shaft. Additionally, Inline and tight "V" and "W" configurations allow the engines to be mounted in any position for repower aviation applications. Single piston can be as light as a 2-Stroke gasoline engine with same HP.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, various operations and behaviors of the systems and/or methods may be described herein without reference to specific software code or specific hardware. One of ordinary skill will appreciate that software and hardware may be designed to implement the systems and/or methods based on the description herein.

Hardware processor modules may range, for example, from general-purpose processor to a field programmable gate array (FPGA) to an application specific integrated circuit (ASIC). Software modules (executed on hardware) may be expressed in a variety of software languages (e.g., computer code), including C, C++, Java™, Javascript, Rust, Go, Scala, Ruby, Visual Basic™, FORTRAN, Haskell, Erlang, and/or other object-oriented, procedural, or other programming language and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

The presence or absence of a summary, abstract, or claims in this application should in no way be considered as limiting on the scope of any inventions disclosed herein.

What is claimed is:

1. A system comprising:
    a magnesium alloy engine block cast as a mono-block to
        receive an exhaust-supercritical fuel mixture and air as input,
        compress the exhaust-supercritical fuel mixture and air to a compression ratio of at least 10:1 and less than 15:1 to produce compressed fuel and air,
        combust the compressed fuel and air, and
        output power and exhaust produced from the combustion of the compressed fuel;
    a fuel reconditioning system configured to
        receive a larger molecule fuel, and
        break down at least a portion of the larger molecule fuel into the smaller molecule fuel;
    an exhaust splitter to split the exhaust into two or more exhaust streams;
    a heat exchanger to heat the smaller molecule fuel using at least one of the exhaust streams;
    a mixer to combine exhaust from at least one of the exhaust streams with the heated smaller molecule fuel to produce the exhaust-supercritical fuel mixture;
    one or more supercritical fuel injectors to inject the exhaust-supercritical fuel mixture in to the engine block;
    a multi-point laser ignition system to ignite the compressed fuel and air in the engine block; and
    an electronic control unit configured to control the fuel reconditioning system, heat exchanger, mixer, exhaust splitter, supercritical fuel injectors, and laser ignition system.

2. The system of claim 1, where
    the engine block has a ceramic inner core.

3. The system of claim 2, where
    the ceramic inner core comprises a ceria stabilized tetragonal zirconia polycrystal.

4. The system of claim 1, where the electronic control unit comprises:
    memory; and
    one or more processors, coupled to the memory, configured to:
        break down at least a portion of the larger molecule fuel into the smaller molecule fuel;
        heat the smaller molecule fuel to a supercritical temperature;
        mix exhaust with the heated smaller molecule fuel to produce the exhaust-supercritical fuel mixture;
        inject the exhaust-supercritical fuel mixture;
        compress the exhaust-supercritical fuel mixture with air to produce the compressed fuel and air;
        ignite the compressed fuel and air using laser light to combust the compressed fuel and air; and
        output the power and exhaust produced from the combustion of the compressed fuel and air.

5. The system of claim 1, where
    mixing the exhaust from the at least one exhaust stream with the heated smaller molecule fuel produces a two-phase mixture prior to injection by the one or more supercritical fuel injectors.

6. The system of claim 1, where
at least one of the one or more supercritical fuel injectors includes a de Laval nozzle.

7. The system of claim 1, where the larger molecule fuel is at least one of diesel fuel, kerosene, and gasoline.

8. The system of claim 1, where the smaller molecule fuels include aliphatic hydrocarbons having a carbon chain length of 8 or less.

9. A method comprising:
providing a magnesium alloy engine block cast as a mono-block to
receive an exhaust-supercritical fuel mixture and air as input, and
output power and exhaust;
breaking down, via a fuel reconditioning system, at least a portion of a larger molecule fuel into a smaller molecule fuel;
splitting, via an exhaust splitter, the exhaust into two or more exhaust streams;
heating, via a heat exchanger, the smaller molecule fuel using at least one of the exhaust streams;
mixing, via a mixer, at least one of the exhaust streams with the heated smaller molecule fuel to produce an exhaust-supercritical fuel mixture;
injecting, via supercritical fuel injectors, the exhaust-supercritical fuel mixture in to the engine block;
compressing, in the engine block, the exhaust-supercritical fuel mixture and the air to produce compressed fuel and air;
igniting, via an optical ignition system and in the engine block, the compressed fuel and air to combust the compressed fuel and air to produce the power and exhaust; and
controlling, via an electronic control unit, the fuel reconditioning system, exhaust splitter, heat exchanger, mixer, supercritical fuel injectors, and optical ignition system.

10. The method of claim 9, where
the engine block has a ceramic inner core.

11. The method of claim 10, where
the ceramic inner core comprises a ceria stabilized tetragonal zirconia polycrystal.

12. The method of claim 9, further comprising:
controlling, by the electronic control unit to:
break down at least a portion of the larger molecule fuel into the smaller molecule fuel;
heat the smaller molecule fuel to a supercritical temperature;
mix exhaust with the heated smaller molecule fuel to produce the exhaust-supercritical fuel mixture;
inject the exhaust-supercritical fuel mixture;
compress the exhaust-supercritical fuel mixture with air to produce the compressed fuel and air;
ignite optically the compressed fuel to combust the compressed fuel and air; and
output power and exhaust produced from the combustion of the compressed fuel and air.

13. The method of claim 9, where
mixing the exhaust from the at least one exhaust stream with the heated smaller molecule fuel produces a two-phase mixture prior to injection.

14. The method of claim 9, where
the electronic control unit controls the temperature of the fuel exiting the heat exchanger to between 560-580° C.

15. A non-transitory computer readable medium storing instructions, the instructions comprising:
one or more instructions which, when executed by one or more processors, cause the one or more processors to:
control a fuel reconditioning system to break down at least a portion of a larger molecule fuel into a smaller molecule fuel;
control an exhaust splitter and heat exchanger to heat the smaller molecule fuel to a supercritical temperature;
control a mixer to mix exhaust from an engine block with the heated smaller molecule fuel to produce an exhaust-supercritical fuel mixture;
control one or more supercritical fuel injectors to inject the exhaust-supercritical fuel mixture into the engine block, forming compressed fuel and air when the exhaust-supercritical fuel mixture is compressed with air in the engine block;
control an optical ignition system to ignite the compressed fuel and air in the engine block to combust the compressed fuel and air in the engine block; and
control output of power and exhaust from the engine block.

16. The non-transitory computer readable medium of claim 15, where at least one of the one or more processors is provided in an electronic control unit.

17. The non-transitory computer readable medium of claim 15, where
mixing the exhaust with the heated smaller molecule fuel produces a two-phase fuel mixture prior to injection.

* * * * *